United States Patent [19]

McDonald et al.

[11] Patent Number: 5,191,593

[45] Date of Patent: Mar. 2, 1993

[54] CONFERENCE CALL FEATURE FOR SPREAD SPECTRUM CORDLESS TELEPHONE

[75] Inventors: James A. McDonald, Buffalo Grove; William F. Pickert, Hoffman Estates, both of Ill.

[73] Assignee: Motorola, Inc., Schaumburg, Ill.

[21] Appl. No.: 709,014

[22] Filed: May 31, 1991

[51] Int. Cl.[5] .............................................. H04K 1/00
[52] U.S. Cl. ........................................ 375/1; 380/34; 379/202
[58] Field of Search ..................... 375/1; 379/202, 203, 379/204, 205, 206, 58, 61, 62; 380/63, 34

[56] References Cited

U.S. PATENT DOCUMENTS

| | | | |
|---|---|---|---|
| 4,049,921 | 9/1977 | Zwack | 379/202 X |
| 4,669,108 | 5/1987 | Deinzer | 379/206 X |
| 4,776,001 | 10/1988 | Murata et al. | 379/62 |
| 5,042,050 | 8/1991 | Owen | 375/1 |

FOREIGN PATENT DOCUMENTS 0375361  6/1990  European Pat. Off. ............. 379/61

Primary Examiner—Tod Swann
Attorney, Agent, or Firm—Jon Christensen

[57] ABSTRACT

A conference call feature is offered for use with spread spectrum cordless communication systems. The conference call feature is achieved through the alternate use of redundant communication resources by units on the conference call. The redundant communication resources in spread spectrum communication systems transmit duplicate copies of messages in high noise environments. In residential environments, noise tends to be less of a problem and can, hence, be used to support a conference call feature.

21 Claims, 3 Drawing Sheets

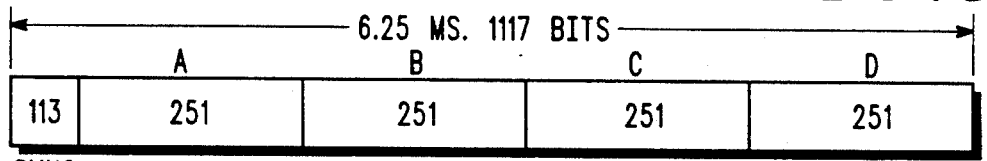

FIG.5 a - TX RAMP UP
b - FRONT COLLISION BITS
c - REAR COLLISION BITS
d - TX RAMP DOWN
e - BASED ON FORMAT NEED

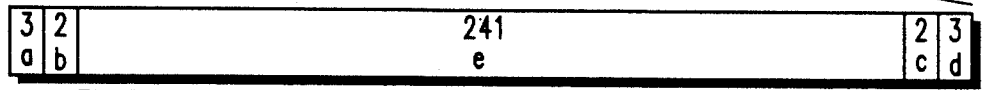

FIG.6 a - TX RAMP UP
b - FRONT COLLISION BITS
c - REAR COLLISION BITS
d - RX RAMP DOWN
i - SYNC CHANNEL
j - FAST SIGNALLING CHANNELS
k - INBAND SIGNALLING CHANNEL
l - B CHANNEL
m - B CHANNEL CHECKSUM

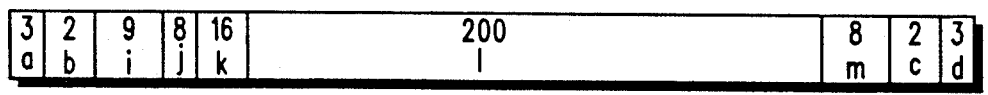

FIG.7 a - TX RAMP UP
b - FRONT COLLISION BITS
c - REAR COLLISION BITS
d - RX RAMP DOWN
η - 0101 IDLE PATTERN
f - SYNCHRONIZATION PATTERN
g - ENCODED DATA

FIG.8

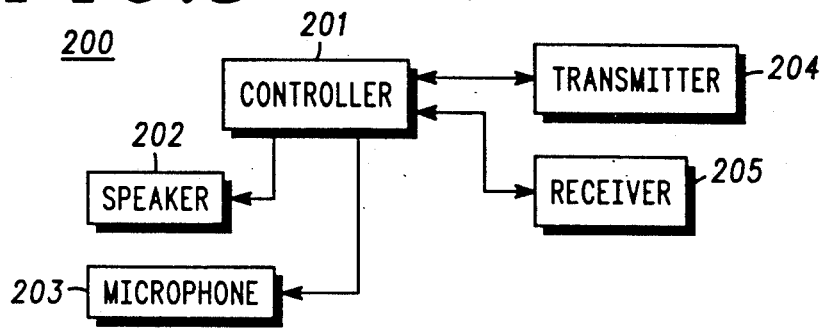

CONFERENCE CALL FEATURE FOR SPREAD SPECTRUM CORDLESS TELEPHONE

FIELD OF THE INVENTION

This invention relates to communication systems, including but not limited to cordless telephone systems.

BACKGROUND OF THE INVENTION

Cordless telephone systems are known. Such systems typically transmit and receive over a frequency pair in full duplex mode over relatively short distances. Power outputs of cordless telephone systems are typically very low at less than 100 milliwatts. The relatively low power output may offer reliable service within a home and a yard proximate to the home.

The low power of the cordless telephone also provides another benefit in that a number of cordless telephones operating on the same frequency may operate in relatively close proximity. Where interference is experienced, provisions are typically provided within cordless telephones for a second operating frequency, selectable from within the telephone, to avoid interference.

Cordless telephones are typically constructed to interface with a public switched telephone network (PSTN) providing access to such PSTN system from a cordless telephone base site within the home. Other telephones are also typically connected to such system also within the same home. Such collection of telephones within the home comprises a party line on which a number of people may participate in the same conversation as a conference call.

Spread spectrum communication systems are also known. Spread spectrum systems are communication systems with a high inherent degree of resistance to interference from other transmitters. Spread spectrum systems achieve their resistance to interference by transmitting an information signal distributed over a relatively wide frequency bandwidth. Use of the wide bandwidth avoids a total blocking of signals from interference present on individual frequencies or limited bands of frequencies.

Two examples of spread spectrum communication systems are direct sequence spread spectrum (DSSS) and frequency hopping. DSSS systems achieve the wide band distribution of a message signal by encoding a signal with an output from a pseudo random number generator. Frequency hoppers, on the other hand, achieve a distribution of signals through an indexing format.

The indexing format used by frequency hoppers involves the transmission of a relatively narrow band information signal which is periodically indexed to a new frequency. Indexing of the transmission signal under frequency hopping format achieves noise immunity by a rapidly changing frequency format. Because of the rapidly changing frequency of transmission, noise present on one frequency tends to block only part of the information signal.

Because of the utility of cordless telephones and spread spectrum technology, a need exists for a way to implement spread spectrum technology to cordless telephones in a manner fully consistent with past services, including conference calling. Past telephone services within the home have offered conference call access to the PSTN through a number of hard-wired extension phones located throughout the home. A need exists for a way to offer such conference call features from remote handsets within a cordless telephone system without the need for hard-wired extension phones.

SUMMARY OF THE INVENTION

A method of providing conference calling on an indexed communication resource of a cordless telephone system is provided. The cordless telephone system has a base site and at least a first and a second communication unit.

The method includes a first step of establishing a communication path for exchanging communicated messages between the first communication unit and the base site. The second step includes enabling the second communication unit to transmit an access request.

In response to the access request, the first communication unit vacates at least part of the indexed communication resource. The second communication unit then establishes a communication path on the vacated resource for exchanging communicated messages between the second communication unit and the base site.

BRIEF DESCRIPTION OF THE DRAWINGS

FIG. 5 depicts the structure of a single TDM frame under the invention.

FIG. 6 depicts the structure of a single slot within a TDM frame during voice transmission under one embodiment of the invention.

FIG. 7 depicts the structure of a single slot within the TDM frame during the exchange of control information under one embodiment of the invention.

FIG. 8 comprises a block diagram of a communication unit under the invention.

DESCRIPTION OF THE PREFERRED EMBODIMENT

Figure 1:
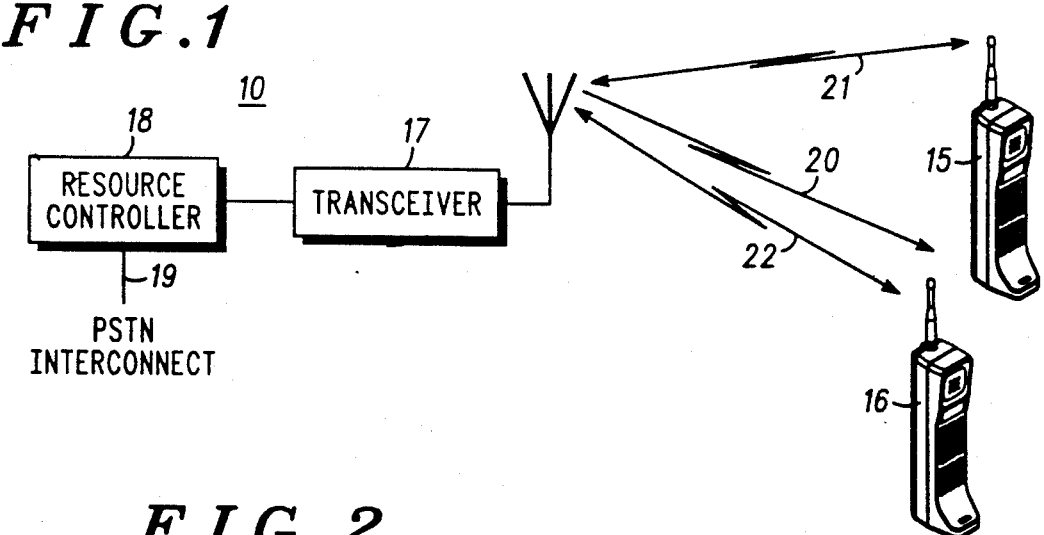
FIG. 1 comprises a block diagram of a conference call cordless telephone system.

Shown (FIG. 1) is a block diagram of a spread spectrum cordless telephone system generally (10). Included within such a system (10) are portable communication units (15 and 16), a base station transceiver (17), and a base station resource controller (18).

Shown connected to the resource controller (18) is an interconnect (19) with a public switched telephone network (PSTN). As shown, a call may originate from within the PSTN through the PSTN interconnect (19) to a communication unit (15 or 16), or from one of the communication units (15 or 16) to another communication unit (15 or 16), or to a PSTN subscriber (not shown).

Shown in FIG. 8 is a block diagram of a communication unit (15 or 16) generally (200). Included within the communication unit (200) is a controller (201), a transmitter (204), a receiver (205), a microphone (203), and a speaker/amplifier (202).

The individual blocks shown in FIGS. 1 and 8 are well known in the art. No further explanations need be or will be offered relative to the blocks within FIGS. 1 and 8 other than where appropriate to assist with further understanding of the invention.

Under one embodiment of the invention, communication units (15 and 16) and the base station transceiver (17) are constructed to transceive under a spread spectrum methodology using a frequency hopping, time division multiplex (TDM), full duplex format. Communications occur under the spread spectrum methodology over a range of frequencies (communication resources) within a designated frequency spectrum. Between each hop, the base station transceiver (17) and communication units (15 and 16) transceive on a communication resource for a period of time sufficient to transceive a single TDM frame containing four slots. In one embodiment of the invention, the first two of the four slots are reserved for transmissions from the base station (17) to the communication units (15 and 16). The first slot of the four slots is also occasionally used as a polling resource to poll communication units (15 and 16) for requests for service by transmitting a polling control word in the first slot. The third and fourth slots of four are reserved for communications transmitted by the communication units (15 and 16) to the base station (17).

In one embodiment of the invention, dwell time on a frequency for transmission and reception of a single TDM frame by communication units (15 and 16) and base station transceiver (17) is 6.25 milliseconds. Transceived within the 6.25 ms, within a single frame, is 1,117 bits of information. Each of the four slots (A, B, C, and D, FIG. 5) in a single frame contains 251 bits of information. The frames (A, B, C, and D) are also preceded by 113 bits provided for synthesizer stabilization.

Each slot (e.g., B in FIG. 5) may be further subdivided into several fields. The largest field, e, may be formatted differently depending on system requirements. Fields a and d (FIG. 5) are used to allow the transmitter to ramp up to full power and to ramp down. Fields b and c (FIG. 5) are used to detect interference from other systems within the time slot.

Shown in FIG. 7 is a format (format 1) that may be used within field e (subfields f, g, and h) for initialization. The format (1) provides a means for establishing a communication path for exchanging communicated messages between a communication unit (15 or 16) and the base station (17). The format shown (FIG. 7) may be used for exchange of control information upon activation of a communication unit (15 or 16) to establish a communication link between the communication unit (15 or 16) and the base station (17). Format 1 (FIG. 7) may also be used as a data channel to communicate control information between communication units (15 and 16) and the base station (17).

As structured, format 1 (FIG. 7) allows a receiving device to attain bit synchronization through an idle pattern of alternating ones and zeros within field h. A further synchronization pattern is found within field f, defining the beginning of valid data. An ID of the transmitting device is found within the final field g.

Shown in FIG. 6 is a format (format 2) that may be used within field e (subfields i, j, k, l, and m) for exchanging voice messages between communication units (15 or 16) and the base station (17) within each TDM slot (A, B, C, or D) of the TDM frame. The format shown (FIG. 6) may be used to convey digitized voice information as well as inband data signalling for rf link maintenance and control. contained within the format (2) is a synchronization field, i (9 bits), containing a marker pattern, inband signalling fields, j and k (24 bits total), a digitized voice field, l (200 bits), and a checksum field, m (8 bits).

The communication units (15 and 16) and the base station transceiver (17) are constructed to transceive over a communication resource within the four slots (A, B, C, and D), under the formats (1 or 2) described for one TDM frame and then index (hop) to another resource in synchronism. Upon indexing to the next resource, the process is repeated.

The indexing resource upon which a communication transaction occurs (indexed resource) between the base station (17) and communication unit (15 and 16) is part of a list of communication resources through which the system (10) cycles in a repeating sequence at a fixed rate. The list of communication resources to be used by the base station transceiver (17) and communication units (15 and 16) is entered at start-up into a table of resources within a memory (not shown) within the resource controller (18) and communication units (15 and 16).

Figure 2:
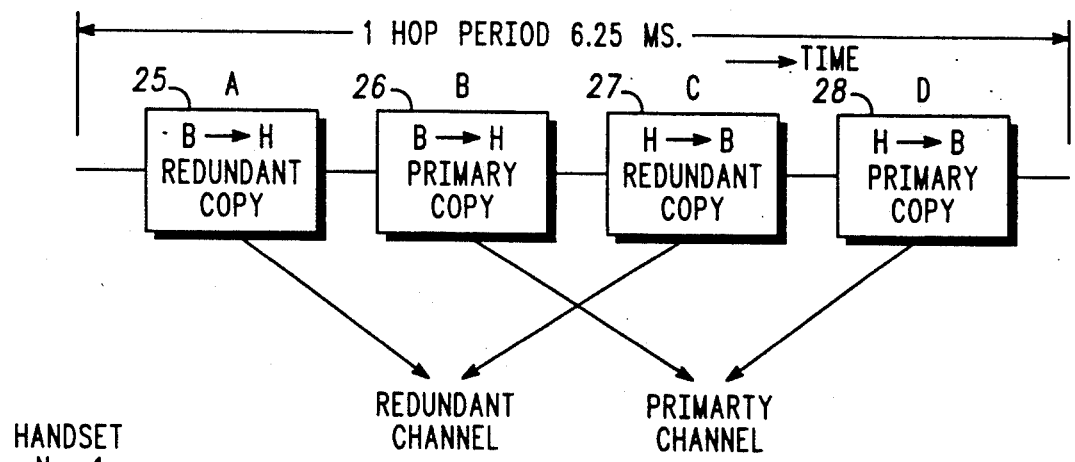
FIG. 2 depicts transmission of primary and redundant information signals within a single hop period.
Figure 3:
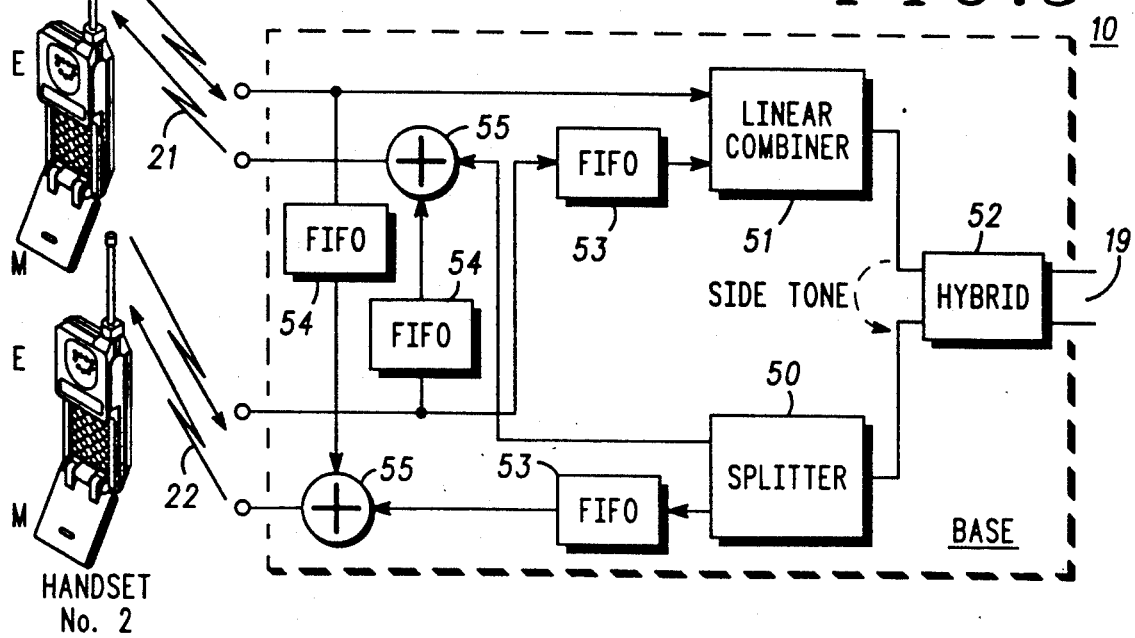
FIG. 3 comprises a block diagram of information flow within the base site.
Figure 4:
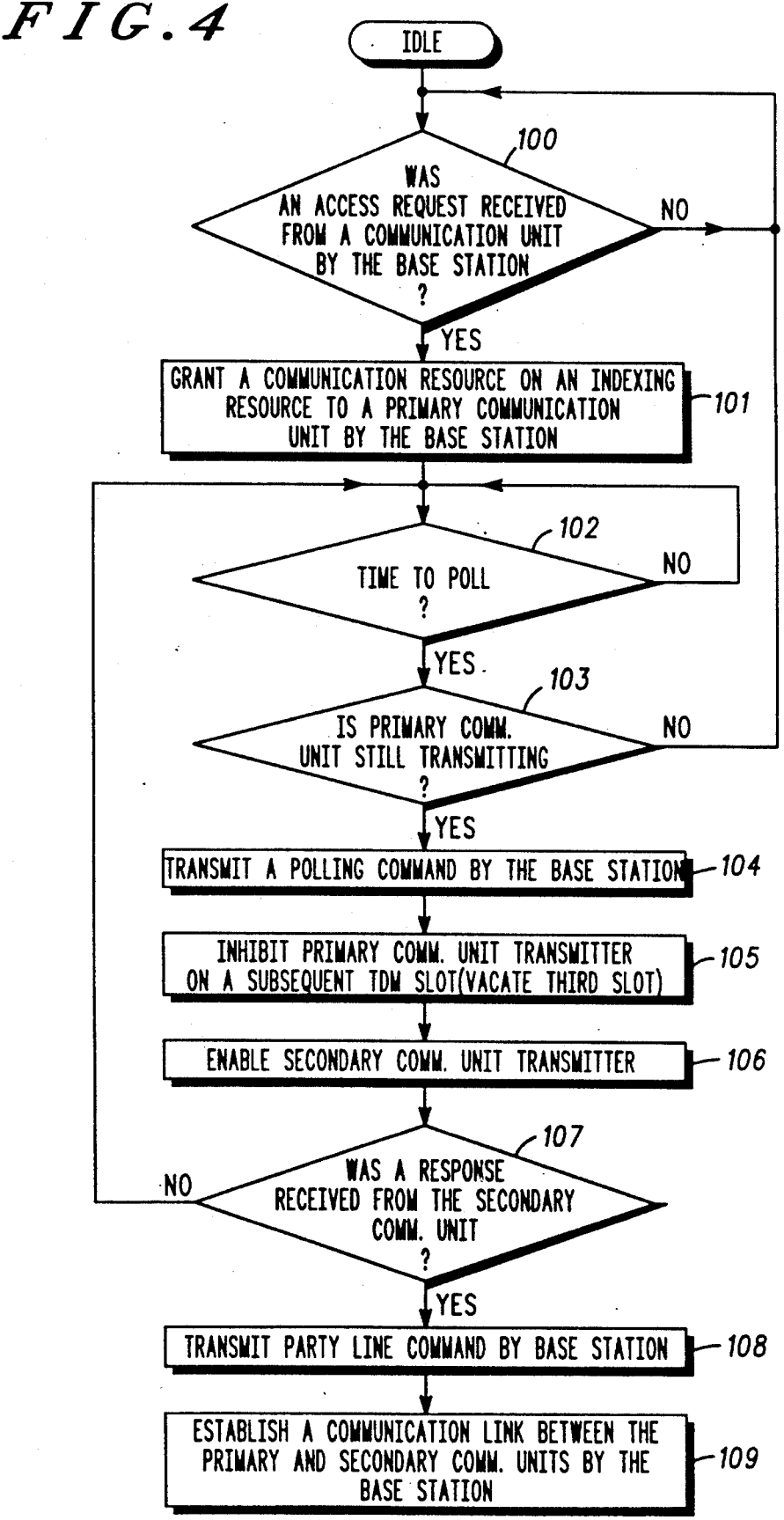
FIG. 4 comprises a flow chart describing a method under the invention of allocating communication resources to a secondary communication unit.

Shown in FIG. 4 is a flow chart by which the functions of the block diagrams of FIGS. 1 through 3 may be better understood.

Upon activation, the base station transceiver (17) is constructed to immediately begin indexing through the table of resources. In one embodiment of the invention, the indexing resource passes through the table of resources at a rate of 6.25 milliseconds per hop. Each time the polling resource is activated (102, FIG. 4), the base station transceiver (17) transmits a polling control word (20) under format 1 in the first and second TDM slots on the polling resource continuously.

The communication units (15 and 16), on the other hand, are constructed to, upon activation, tune to a resource listed within the table of resources and index at a very low rate (one index for every cycle of the base site (17) through the table of resources). Upon desiring service, an operator (not shown) activates a button on a first communication unit (15) requesting a communication path for exchanging communicated messages with the base site. The communication unit (15), initially, takes no action other than to monitor for the next polling control word. The polling control word provides a means for enabling the communication unit (15 or 16) to transmit an access request (21). The next time the communication unit (15) receives the polling control word, the communication unit (15) transmits an access request (21) under format 1 in the third and fourth TDM slots of the same TDM frame as the received polling resource. If the polling control word is not received by the communication unit because of noise or otherwise, another polling control word will be transmitted by the base station (17) on another resource at a later time.

In the alternative to transmission of a polling control word, the resource controller (18) may transmit a paging request (not shown) seeking access to a communication unit (15 or 16) from a PSTN subscriber (not shown). The paging request is transmitted under format 1 in the first and second slots (A and B, FIG. 5). Receipt of a paging request causes the communication unit (15 and 16) to alert the operator of the communication unit (15 or 16) to an incoming call. The operator responds, as above, by pressing a button causing the transmission of an access request (21) also under format 1.

In addition to transmitting an access request (21), the communication unit (15) begins indexing in synchronism with the base station (17). The base station (17), upon receiving the access request, transmits (within the next TDM frame) a resource grant control word (101, FIG. 4) (21) in the first and second TDM slots to the communication unit (15) granting access.

Following the access grant to the communication unit (15), an information (voice) signal (21) under format 2 may be exchanged between the communication unit (15) and the base station transceiver (17).

To enhance audio quality when a single, primary communication unit (15) is communicating with the base station (17), duplicate copies of the audio data message are transceived between the communication unit (15) and the base site transceiver (17) under format 2. The duplicate copies are transmitted on alternate frequency hops to avoid loss of audio information caused by interference blocking of any one resource.

FIG. 2 represents data transmitted within a TDM frame on any one resource (between frequency hops) within the four TDM slots (A, B, C, and D). As shown, the first and second slots (A and B) contain data messages (25 and 26) transmitted from the base station (17) to the communication unit (15). Slots C and D contain data (27 and 28) transmitted by the communication unit (15) to the base station (17). As shown, slots B and D represent the primary communication channel between the communication unit (15) and the base station (17). Slots A and C, on the other hand, represent a secondary data channel over which a redundant copy of audio information may be transmitted. The redundant copy transmitted over slots A and C (FIG. 2) are copies of information transmitted as primary copies in slots B and D of the previous TDM frame.

Once access has been granted to the primary (first) communication unit (15), communication occurs substantially as described above. An exception, on the other hand, occurs as the primary communication unit (15) and base station (17) pass through a polling sequence (102, FIG. 4) on the indexed resource. When the base station (17) detects that the first TDM slot (A) on the indexed resource is to become the polling channel through receipt of a signal from the polling timer, then the redundant data message (25, FIG. 20) is discarded and replaced with a polling message (20) (under format 1) (104, FIG. 4). Discarding the redundant data message (25) will not disrupt a communicated message to the primary communication unit (15) since a primary copy (under format 2) of the same message was transmitted within the previous TDM frame.

Receipt of the polling message (20) causes the primary communication unit (15) to vacate (105, FIG. 4) at least some of the indexed resource (redundant slot C) under control of a means for vacating, such as the communication unit controller (201). Receipt of the polling message also allows a secondary communication unit (16) to transmit (106, FIG. 4) an access request (22) (under format 1) in the vacated, third TDM slot (C) on the same frame as the polling resource.

If the secondary communication unit (16) is not activated, or the base station (17) does not receive the access request (22), then the primary communication unit (15) and base station (17) resume transmission of primary and redundant information (FIG. 2) after completing the polling sequence (one cycle through the table of resources). If, on the other hand, the base station (17) does receive the access request (22) (107, FIG. 4) from the secondary communication unit (16), then the base station (17) responds with a party-line (conference call) grant (22) (108, FIG. 4) transmitted in the first TDM slot (A) on the indexed resource within the TDM frame first following receipt of the access request (22).

Transmission of the party-line grant (22) (108, FIG. 4) causes the primary communication unit (15) to communicate (in format 2) with the base station (17) on the primary channel (26 and 28) (vacating at least part (slots B and D) of the indexed resource) and the secondary communication unit (16) to communicate (in format 2) with the base station (17) on the redundant channel (A and C) (the vacated slots).

The base station (17) receives the transmitted audio from the primary communication unit (15) (28, FIG. 2) and the transmitted audio from the secondary communication unit (16) (27, FIG. 2), combines such signals, and re-transmits the audio information (109, FIG. 4) for the benefit of the primary and secondary communication units (15 and 16).

Shown (FIG. 3) is a simplified block diagram of the base station (10). The simplified transmitted messages (21 and 22), shown on the left side of the drawing (FIG. 3), represent information transmitted within the four slots (A, B, C, and D) of a TDM frame. As shown, a base station (10) contains a hybrid circuit (52), a linear combiner (51), a splitter (50), first-in-first-out (FIFO) devices (53), and combiner devices (55).

During a conference call involving primary and second communication units (15 and 16) and a PSTN subscriber, an audio message (21) from a primary communication unit (15) (H.S. 1, FIG. 3) is combined with an audio message from a secondary communication unit (16) (H.S. 2) through the use of a linear combiner (51), FIFO (53) and hybrid circuit (52) before transmission to a PSTN subscriber (not shown) through a PSTN interconnect (19). Differences in timing between RF rate and digitized audio rate between the primary unit (H.S. 1) and the secondary unit (H.S. 2) are accommodated through the use of FIFO memory devices (53). Incoming audio messages from a PSTN subscriber (not shown) enter the base station (10) through the PSTN interconnect (19) and are similarly processed through the hybrid circuit (52) and a splitter (50). Audio messages between the primary unit (H.S. 1) and secondary unit (H.S. 2) are processed through the use of a FIFO (54) device and a combiner (55).

In another embodiment of the invention, the system (10) may be used as a full-duplex intercom. Under such an embodiment, a transmitted message (21) from the primary communication unit (15) is processed through a FIFO (54) and combiner (55) before transmission (22) to the secondary communication unit (16). A transmitted message (21) from the secondary communication unit (16) is, similarly, processed through a FIFO (54) and combiner (55) before transmission (22) to the primary communication unit (15).

In another embodiment of the invention, for a conference call, the primary and secondary communication units (15 and 16) transceive audio information on alternating hops on the indexed resource. Under such an embodiment, a primary communication unit (15) occupies a first frame and transceives primary and redundant copies of audio information within the first frame. On a second frame (first following the first frame), the secondary communication unit (16) transceives a primary and redundant copy of audio information. In a third frame, the primary communication unit (15) again transceives, etc.

In another embodiment of the invention, for a conference call, the primary and secondary communication units (15 and 16) transceive audio information on each successive hop. Audio information, on the other hand, is comprised of alternating primary and redundant copies of communicated information. In such an embodiment, in a first frame, the primary communication unit (15) receives a primary copy of audio information in slot B and transmits a primary copy of audio information in slot D. The secondary communication unit (16) in the same (first) frame receives a primary copy of audio information in slot A and transmits a primary copy of audio information in slot C. In the next (second) frame, the primary communication unit (15) receives a redundant copy of audio information in slot B and transmits a redundant copy of audio information in slot D. The secondary communication unit (16) in the same (second) frame receives a redundant copy of audio information in slot A and transmits a redundant copy of audio information in slot C.

In a further embodiment of the invention, audio information, during a conference call, from the primary and secondary communication units (15 and 16) and from a PSTN subscriber are combined into a single audio signal within the resource controller (18), represented by a single data word, and transmitted as a primary and redundant copy (in slots A and B) to the primary and secondary communication units (15 and 16). Transmissions from the primary and secondary communication units (15 and 16) to the base station (17) remain as above.

In another embodiment of the invention, conference call operation is authorized by activation of a pushbutton and transmission of a control word by the primary communication unit (15) to the base station (17). Under such an embodiment, polling messages transmitted by the base station (17) would not occur until receipt of the authorization control word by the base station (17) from the primary unit (15).

In another embodiment of the invention, the polling control sequence is activated by a timer within the first communication unit (15 or 16) under the control of a switch (not shown). The polling control word is transmitted by the first communication unit (15 or 16) to the base site transceiver (17). The base site transceiver (17) repeats the polling control word on the polling resource for one cycle through the table of resources. The first communication unit (15 or 16) then monitors for an access request in the third TDM slot (C) from the second communication unit (16). Upon receipt of the access request by the first communication unit (15 or 16), the base station (17) transmits an access grant to the second communication unit (16) and modifies its transmission sequence as above.

What is claimed is:

1. A method of providing conference calling on an indexed communication resource of a cordless telephone system having a base site, and at least a first and second communication unit, such method including the steps of:
    A) establishing a communication path for exchanging communicated messages between the first communication unit and the base site;
    B) enabling the second communication unit to transmit an access request;
    C) vacating at least some of the indexed communication resource by the first communication unit in response to enabling the second communication unit; and
    D) establishing a communication path for exchanging communicated messages between the second communication unit on the vacated indexed resource and base site.

2. The method of claim 1 wherein the step of establishing a communication path for exchanging communicated messages further includes the steps of synchronizing and transceiving communicated messages on the indexed communication resource under a TDM format having at least four slots per TDM frame.

3. The method as in claim 2 wherein transceiving communicated messages further includes the step of transmitting a primary and redundant message within the at least four TDM slots per TDM frame.

4. The method as in claim 2 wherein the steps of enabling, vacating, and establishing further includes the step of discarding redundant messages between the base site and the first communication unit.

5. The method as in claim 1 wherein the step of enabling the second communication unit to transmit an access request further includes the step of initiating a polling sequence within the base site and transmitting a polling word by the base site to the second communication unit.

6. A device for providing conference calling on an indexed communication resource of a cordless telephone system having a base site, and at least a first and second communication unit and the base site;
    A) means for establishing a communication path for exchanging communicated messages between the first communication unit and the base site;
    B) means for enabling the second communication unit to transmit an access request;
    C) means for vacating at least some of the indexed communication resource by the first communication unit in response to enabling the second communication unit; and
    D) means for establishing a communication path between the second communication unit on the vacated indexed resource and base site.

7. The device of claim 6 wherein the means for establishing a communication path for exchanging communicated messages further includes means for synchronizing and transceiving communicated messages on the indexed communication resource under a TDM format having at least four slots per TDM frame.

8. The device as in claim 7 wherein the means for transceiving communicated messages further includes means for transmitting a primary and redundant message within the at least four TDM slots per TDM frame.

9. The device as in claim 8 wherein the means for enabling, vacating, and establishing further includes means for discarding redundant messages between the base site and the first communication unit.

10. The device as in claim 6 wherein the means for enabling the second communication unit to transmit an access request further includes means for initiating a polling sequence within the base site and transmitting a polling word by the base site to the second communication unit.

11. A communication unit for providing conference calling on an indexed communication resource of a cordless telephone system having a base site, the communication unit comprising:
    A) means for monitoring an indexed communication resource for a paging request and, upon occasion, a polling word;

B) means for establishing a communication path for exchanging communicated messages between the communication unit and the base site;

B) means for enabling a second communication unit to transmit an access request; and C) means for vacating at least some of the indexed communication resource by the communication unit in response to enabling the second communication unit.

12. A method of providing conference call access to at least two communication units on a single, indexed communication resource in a spread spectrum cordless telephone system having a base site transceiver with a resource controller, a plurality of communication resources, and wherein a first communication unit of the at least two communication units is communicating through a base site on an indexed resource of the plurality of resources, such method comprising the steps of:

A) activating a second communication unit of the at least two communication units;

B) monitoring a resource of the plurality of communication resources by the second communication unit for a polling control message transmitted by the resource controller through the base site transceiver;

C) transmitting an access request by the second communication unit in response to the polling control message;

D) receiving by the first communication unit the request for access;

E) vacating at least part of the indexed communication resource by the first communication unit;

F) synchronizing the second communication unit to the indexing resource in synchronism with the first communication unit and the base site transceiver on the vacated resource; and G) establishing a communication link between the second communication unit, the base site transceiver, and the first communication unit on the indexed resource.

13. The method as in claim 12 wherein the access request transmitted by the second communication unit is received by the resource controller through the base site transceiver and re-transmitted for the benefit of the first communication unit.

14. The method as in claim 12 wherein the second and first communication unit alternate transmissions on alternate indexed communication resources.

15. The method as in claim 12 wherein the communication units transceive information in a TDM format.

16. A spread spectrum cordless telephone communication system allowing conference call communications between two communication units on a single indexing resource through a base site transceiver, such cordless telephone communication system comprising:

A) an indexing table of communication resources containing a plurality of communication resources;

B) a base site transceiver for communicating with a first and, upon occasion, a second communication unit on an indexed resource of the indexing table of communication resources;

C) means for synchronizing with and exchanging communicated messages between the first communication unit and the base site transceiver on an indexing resource upon receiving a request for service from the first communication unit in response to a polling request;

D) means for transmitting a polling message to and receiving a resource request from the second communication unit by the base site transceiver while the base site transceiver is exchanging communicated messages with the first communication unit;

E) means for synchronizing the first and the second communication units to interleaved alternate indexed resources upon receipt of the resource request from the second communication unit in response to the polling request from the base site transceiver; and F) mean for exchanging communicating messages between the first and second communication units.

17. The system as in claim 16 wherein the communication units communicate in a TDM format.

18. The system as in claim 16 wherein the first communication unit and the base site transceiver further contains means for activating a polling sequence in response to an authorization control word received from the first communication unit.

19. The system as in claim 16 further including means to exchange communicated messages from the first and second communication units with a PSTN interconnect.

20. The system as in claim 16 wherein the means to exchange communicated messages comprises the base site transceiver and a memory operatively coupled to the base site transceiver.

21. A cordless telephone communication unit for use with a spread spectrum cordless telephone communication system allowing conference call communications between two communication units on a single indexing resource through a base site transceiver, such cordless telephone communication unit comprising:

A) means for synchronizing with and exchanging communicated messages between the communication unit and the base site transceiver on an indexing resource upon receiving a request for service from the first communication unit in response to a polling request;

B) means for transmitting a polling message to and receiving a resource request from the second communication unit by the base site transceiver while the base site transceiver is exchanging communicated messages with the first communication unit;

C) means for synchronizing the first and the second communication units to interleaved alternate indexed resources upon receipt of the resource request from the second communication unit in response to the polling request from the base site transceiver; and D) mean for exchanging communicating messages between the first and second communication units.

* * * * *

UNITED STATES PATENT AND TRADEMARK OFFICE
CERTIFICATE OF CORRECTION

PATENT NO. : 5,191,593

DATED : Mar. 2, 1993

INVENTOR(S) : McDonald et al.

It is certified that error appears in the above-identified patent and that said Letters Patent is hereby corrected as shown below:

In column 8, line 29, delete the words "and the base site;" and replace with --, the device comprising:--.

Signed and Sealed this

Thirtieth Day of November, 1993

Attest:

BRUCE LEHMAN

Attesting Officer

*Commissioner of Patents and Trademarks*